(12) United States Patent
Chang et al.

(10) Patent No.: US 9,075,302 B2
(45) Date of Patent: Jul. 7, 2015

(54) COMPUTING DEVICE, STORAGE MEDIUM, AND METHOD FOR CALIBRATING LIGHT CHANNELS OF LIGHT SOURCE DEVICE

(71) Applicants: Chih-Kuang Chang, New Taipei (TW); Zhong-Kui Yuan, Shenzhen (CN); Jian-Hua Liu, Shenzhen (CN); Na Yu, Shenzhen (CN); Li Jiang, Shenzhen (CN)

(72) Inventors: Chih-Kuang Chang, New Taipei (TW); Zhong-Kui Yuan, Shenzhen (CN); Jian-Hua Liu, Shenzhen (CN); Na Yu, Shenzhen (CN); Li Jiang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 374 days.

(21) Appl. No.: 13/651,358

(22) Filed: Oct. 12, 2012

(65) Prior Publication Data
US 2013/0257286 A1    Oct. 3, 2013

(51) Int. Cl.
*G03B 15/05* (2006.01)
*G03B 43/00* (2006.01)
*H04N 5/232* (2006.01)
*H04N 5/225* (2006.01)

(52) U.S. Cl.
CPC .............. *G03B 43/00* (2013.01); *G03B 15/05* (2013.01); *H04N 5/232* (2013.01); *H04N 5/2256* (2013.01)

(58) Field of Classification Search
CPC ....... G03B 43/00; G03B 15/05; H04N 5/2256; H04N 5/232; G01J 1/0411
See application file for complete search history.

(56) References Cited

U.S. PATENT DOCUMENTS

| | | | | |
|---|---|---|---|---|
| 7,015,447 | B2 * | 3/2006 | Yoshida et al. | 250/205 |
| 8,081,216 | B2 * | 12/2011 | Cheung et al. | 348/207.1 |
| 2009/0212709 | A1 * | 8/2009 | Meijer et al. | 315/153 |
| 2010/0283883 | A1 * | 11/2010 | Sato et al. | 348/335 |
| 2012/0081532 | A1 * | 4/2012 | Kumai | 348/77 |
| 2013/0293744 | A1 * | 11/2013 | Attar et al. | 348/234 |
| 2014/0265879 | A1 * | 9/2014 | Dillen | 315/153 |
| 2014/0375217 | A1 * | 12/2014 | Feri et al. | 315/151 |
| 2015/0044098 | A1 * | 2/2015 | Smart et al. | 422/82.05 |

* cited by examiner

*Primary Examiner* — Jung Kim
(74) *Attorney, Agent, or Firm* — Novak Druce Connolly Bove + Quigg LLP

(57) ABSTRACT

In a method of a computing device for calibrating light channels, one or more channel options of an illumination selecting unit of the computing device are selected to turn on the one or more light channels of a light source device. A camera unit captures a first image of the light source device. A zone and a serial number of each light channel are marked on the first image. Each channel option of the illumination selecting unit is eliminated. The camera unit captures a second image of the light source device when a light channel is turned off. The first image and the second image are compared, and a correlation between the light channel that is turned off and the eliminated channel option is determined. The serial numbers of the channel options are modified and remapped according to correlations between each light channel and each channel option.

15 Claims, 5 Drawing Sheets

COMPUTING DEVICE, STORAGE MEDIUM, AND METHOD FOR CALIBRATING LIGHT CHANNELS OF LIGHT SOURCE DEVICE

BACKGROUND

1. Technical Field

Embodiments of the present disclosure relate to the field of image measurement, and more particularly to a computing device, a storage medium, and a method for calibrating light channels of a light source device.

2. Description of Related Art

To measure an object, a computing device controls a light source device to illuminate the object from various points. The light source device includes a circuit board and a plurality of light channels. If a light channel is turned on, the light channel provides illumination in a very specific direction. The circuit board includes control circuits that are used to electronically connect the computing device and each of the light channels, so that the computing device can control each light channel to be turned on or turned off.

However, if connections between the circuit board and the light channels are disordered, for example, a control circuit should connect to a No. 1 light channel, but the control circuit connects to a No. 2 light channel due to human error, the computing device cannot accurately control the No. 1 light channel or the No. 2 light channel to be turned on.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language, such as Java, C, or assembly. One or more software instructions in the modules may be embedded in firmware, such as in an EPROM. The modules described herein may be implemented as either software and/or hardware modules and may be stored in any type of non-transitory computer-readable storage medium or other storage device. Some non-limiting examples of non-transitory computer-readable storage medium include CDs, DVDs, BLU-RAY, flash memory, and hard disk drives.

Figure 1:
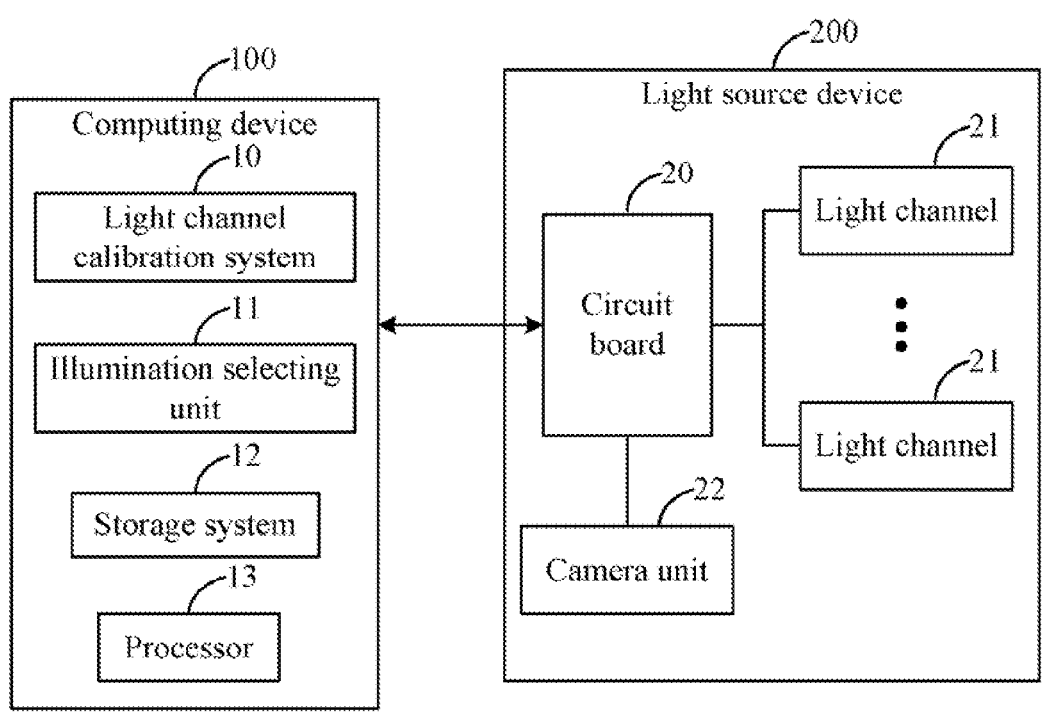
FIG. 1 is a block diagram of one embodiment of a computing device including a light channel calibration system.

FIG. 1 is a block diagram of one embodiment of a computing device 100 including a light channel calibration system 10. In the embodiment, the computing device 100 further includes an illumination selecting unit 11, a storage system 12, and at least one processor 13. The light channel calibration system 10 may be in form of one or more programs that are stored in the storage system 12 and executed by the at least one processor 13. FIG. 1 is just one example of the computing device 100 that can be included with more or fewer components than shown in other embodiments, or have a different configuration of the various components.

The illumination selecting unit 11 controls a light source device 200 to illuminate in specific directions. In the embodiment, the light source device 200 includes a circuit board 20 and a plurality of light channels 21. Each of the light channels 21 is composed of a plurality of light emitting diodes. Each of the light channels 21 is labeled with a unique serial number, such as a No. 1 light channel 21, a No. 2 light channel 21, and No. n light channel 21. The circuit board 20 includes control circuits that electronically connect each of the light channels 21, in order to supply electrical power to each of the light channels 21. Furthermore, the circuit board 20 includes serial ports (not shown in FIG. 1) for electronically connecting to the computing device 100. After the light source device 200 electronically connects to the computing device 100 via the circuit board 20, the illumination selecting unit 11 can control each of the light channels 21 to be turned on or turned off according to user operations.

Figure 2:
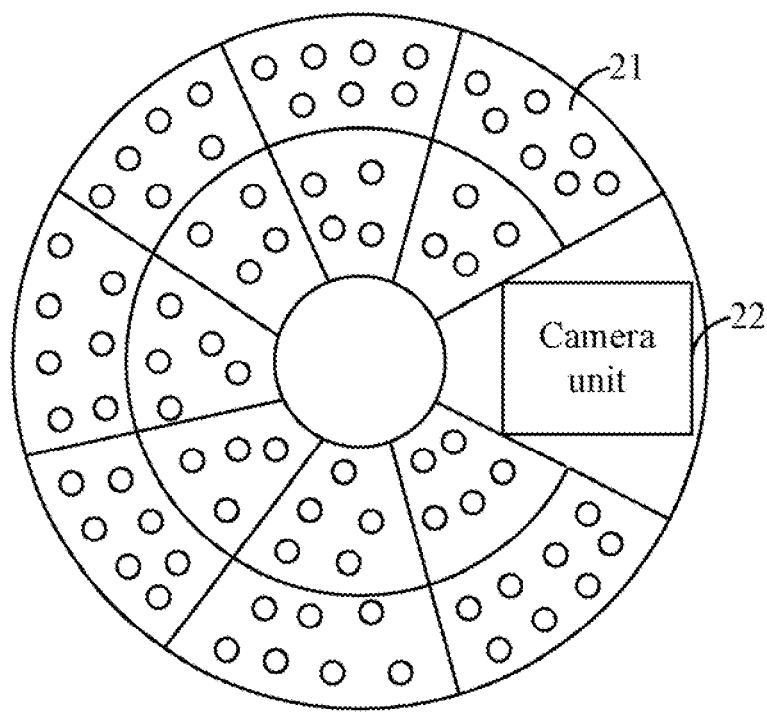
FIG. 2 is a schematic diagram illustrating an example of a light source device of FIG. 1.

FIG. 2 is a schematic diagram illustrating an example of a light source device 200 of FIG. 1. Each circular aperture in FIG. 2 represents a light emitting diode. Each inner or outer segment (grid) of the light source device 200 includes several circular apertures in FIG. 2, and each grid represents a light channel 21. The light source device 200 in FIG. 2 includes fourteen light channels 21, in one example. Each individual light channel 21 may be turned on, and provide illumination in a specific direction.

Figure 3:
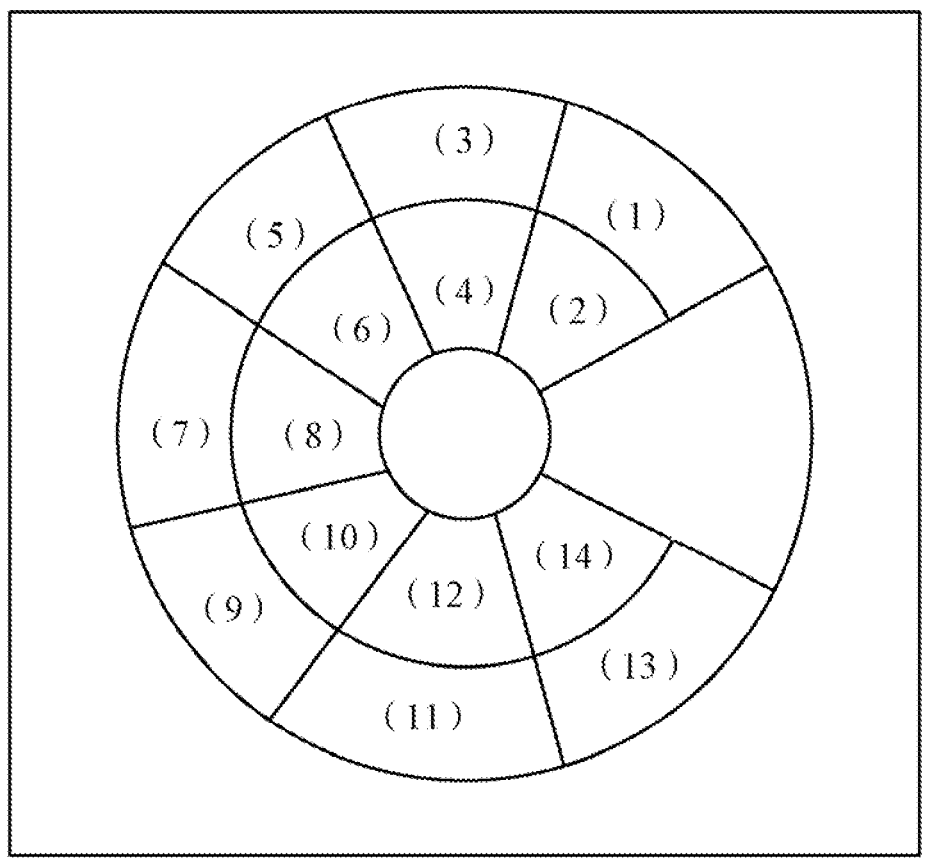
FIG. 3 is a schematic diagram illustrating an example of a user interface of an illumination selecting unit of FIG. 1.

FIG. 3 is a schematic diagram illustrating an example of a user interface of the illumination selecting unit 11 of FIG. 1. The user interface of the illumination selecting unit 11 displays a schematic diagram of the light source device 200 on a display unit of the computing device 100. In the schematic diagram of the light source device 200, each light channel 21 has a corresponding channel option. In FIG. 3, each channel option in the schematic diagram is also labeled with a unique serial number, such as a channel option (1), a channel option (2), . . . , and a channel option (14). Referring to FIG. 2, the channel option (1), the channel option (2), . . . , and the channel option (14) respectively correspond to the fourteen light channels 21 of the light source device 200. The user can turn on any light channel 21 by selecting a channel option of the user interface of the illumination selecting unit 11.

The light source device 200 further includes a camera unit 22. When a glass is placed in front of the light source device 200, the camera unit 22 is configured to take pictures of a reflection image of the light source device 200 from the glass. The pictures taken by the camera unit 22 are transmitted to the computing device 100 via the circuit board 20. The computing device 100 can process the pictures, such as normalizing the digital data representing the pictures.

If connections between the circuit board 20 and the light channels 21 are disordered, there will be a lack of correspondence between the channel options of the illumination selecting unit 11 and the light channels 21 of the light source device 200. For example, the user may select the channel option (1) of the illumination selecting unit 11 in order to turn on the No. 1 light channel 21. However, if the channel option (1) actually corresponds to a No. 5 light channel 21, the user will actually turn on the No. 5 light channel 21 by selecting the channel option (1). The light channel calibration system 10 is to calibrate and correct the correspondence between the channel options of the illumination selecting unit 11 and the light channels 21 of the light source device 200.

In one embodiment, the storage system 12 may be a random access memory (RAM) for temporary storage of information, and/or a read only memory (ROM) for permanent storage of information. In other embodiments, the storage system 12 may also be an external storage device, such as a hard disk, a storage card, or a data storage medium. The at least one processor 13 executes operations of the computing device 100, to provide functions of the computing device 100.

Figure 4:
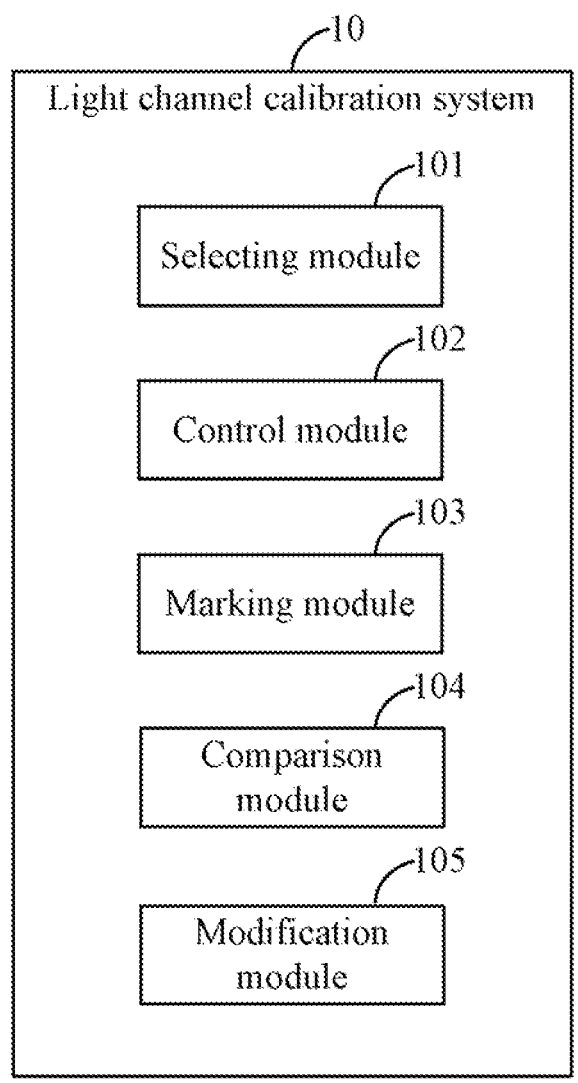
FIG. 4 is a block diagram of one embodiment of functional modules of the light channel calibration system included in the computing device of FIG. 1.

FIG. 4 is a block diagram of one embodiment of functional modules of the light channel calibration system 10 included in the computing device 100 of FIG. 1. In the embodiment, the light channel calibration system 10 may include a selecting module 101, a control module 102, a marking module 103, a comparison module 104, and a modification module 105. The modules 101-105 may comprise a plurality of functional modules each comprising one or more programs stored in the storage system 12, and accessible and executable by the at least one processor 13. A detailed description of each module will be given.

Figure 5:
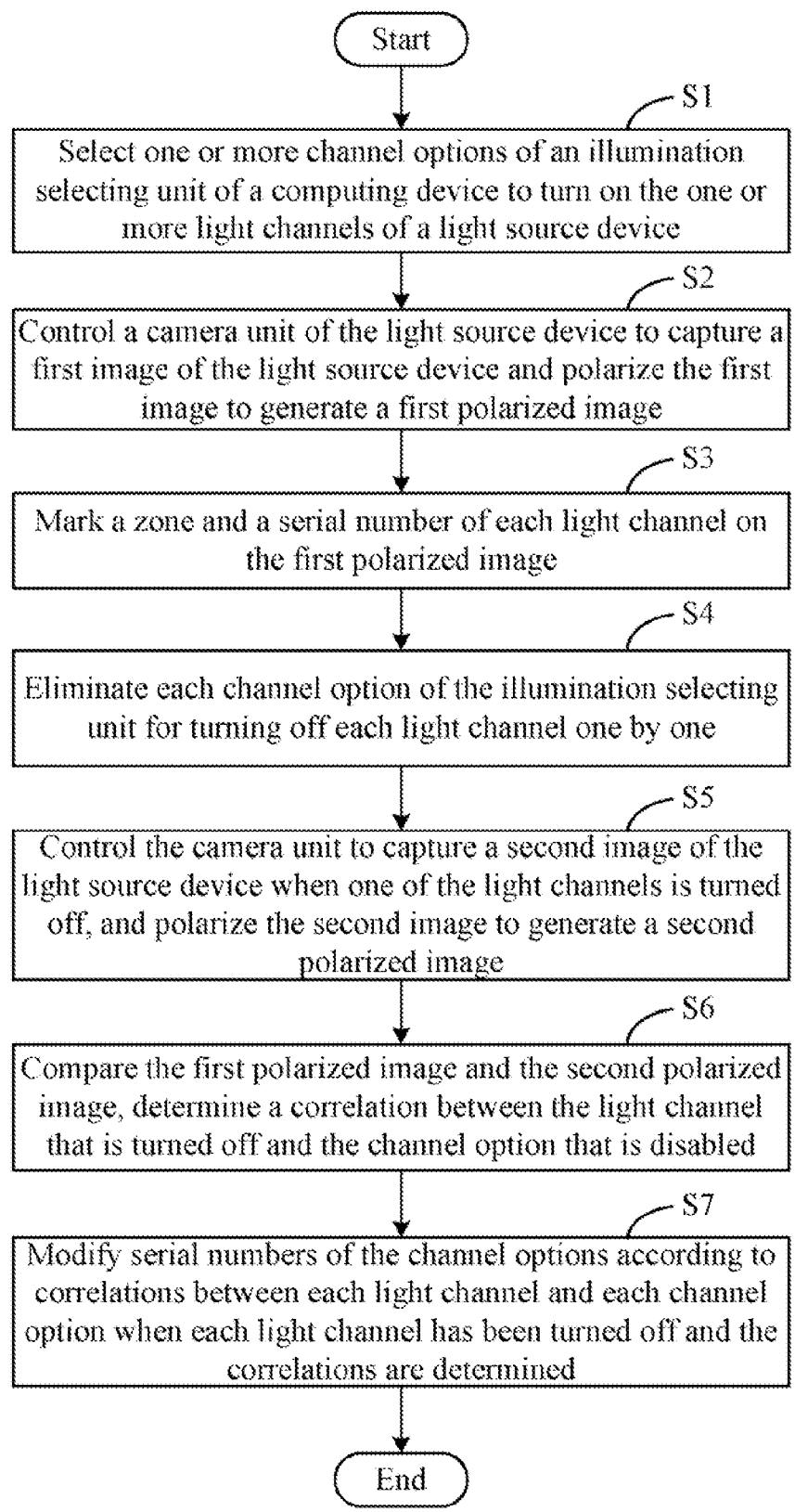
FIG. 5 is a flowchart of one embodiment of a method for calibrating light channels of the light source device of FIG. 1.

FIG. 5 is a flowchart of one embodiment of a method for calibrating light channels 21 of the light source device 200 of FIG. 1. Depending on the embodiment, additional steps may be added, others removed, and the ordering of the steps may be changed.

In step S1, the selecting module 101 selects one or more channel options of the illumination selecting unit 11 to turn on the one or more light channels 21 of the light source device 200.

In step S2, the control module 102 controls the camera unit 22 to capture a first image of the light source device 200, and polarizes the first image to generate a first polarized image in binary form. For example, if the user places a glass in front of the light source device 200, the camera unit 22 captures the first image of the light source device 200 by taking a picture of a reflection of the light source device 200 from the glass. Polarizing the first image refers to a process that converts the first image into a black or white image in binary form. Only two given pixel values (i.e., 0 and 255) are allowed for each pixel of the black or white image. The pixel value 0 refers to pure white and the pixel value 255 refers to pure black in the black or white image. In the embodiment, if one of the light channels 21 is turned on, the light channel 21 on the first polarized image appears white. If one of the light channels 21 is turned off, the light channel 21 on the first polarized image appears black. The camera unit 22 appears black on the first polarized image.

In step S3, the marking module 103 marks a zone and the serial number of each light channel 21 on the first polarized image according to a position of each light channel 21 on the light source device 200, and stores the marked first polarized image in the storage system 12.

In step S4, the selecting module 101 further eliminates each channel option of the illumination selecting unit 11 for turning off each light channel 21 one by one. Each time a light channel 21 is turned off, a remaining part of the light channels 21 of the light source device 200 remain on.

In step S5, the control module 102 further controls the camera unit 22 to capture a second image of the light source device 200 when one, or another one, of the light channels 21 is turned off, and polarizes the second image to generate a second polarized image in binary form.

In step S6, the comparison module 104 compares the first polarized image and the second polarized image, recognizes a serial number of a light channel 21 that is turned off, determines a correlation between the light channel 21 that is turned off and the channel option that is eliminated, and stores the correlation in the storage system 12. For example, if the channel option (1) of the illumination selecting unit 11 is eliminated, and the comparison module 104 recognizes that the No. 5 light channel 21 is turned off, the comparison module 104 determines a correlation between the channel option (1) and the No. 5 light channel.

In step S7, the modification module 105 modifies the serial numbers of the channel options according to the correlations between each light channel 21 and each channel option stored in the storage system 12, upon the condition that each light channel 21 has been turned off and the correlations between each light channel 21 and each of the channel options have previously been determined After the serial numbers of the channel options are modified, a serial number of a channel option is the same as a serial number of a light channel 21 that correlates with the channel option. For example, if the No. 1 light channel correlates with the channel option (5), the modification module 105 maps or remaps the channel option (5) into channel option (1).

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, comprising:
   a storage system;
   at least one processor;
   one or more programs stored in the storage system and executed by the at least one processor, the one or more programs comprising:
   a selecting module that selects one or more channel options of an illumination selecting unit of the computing device to turn on the one or more light channels of a light source device that is electronically connected to the computing device;
   a control module that controls a camera unit of the light source device to capture a first image of the light source device and polarizes the first image into a first polarized image;
   a marking module that marks a zone and a serial number of each light channel on the first polarized image according to a position of each light channel on the light source device, and stores the marked first polarized image in the storage system;
   the selecting module further eliminating each channel option of the illumination selecting unit to turn off each light channel one by one, wherein one of the light channels is turned off each time, wherein a remaining part of the light channels of the light source device remain on;
   the control module further controlling the camera unit to capture a second image of the light source device when one of the light channels is turned off, and polarizes the second image to generate a second polarized image;
   a comparison module that compares the first polarized image and the second polarized image, determines a correlation between the light channel that is turned off and the channel option that is eliminated, and stores the correlation in the storage system;
   a modification module that modifies serial numbers of the channel options according to correlations between each light channel and each channel option stored in the storage system when each light channel has been turned off and the correlations are determined.

2. The computing device of claim 1, wherein the camera unit captures the first image or the second image of the light source device by taking a picture of a reflection image of the light source device from a glass that is placed in front of the light source device.

3. The computing device of claim 1, wherein the comparison module compares the first polarized image and the second polarized image, recognizes a serial number of a light channel that is turned off, and determines the correlation between the light channel that is turned off and the channel option that is eliminated.

4. The computing device of claim 1, wherein the serial number of the channel option is the same as a serial number of a light channel that correlates with the channel option after the serial numbers of the channel options are modified.

5. The computing device of claim 1, wherein the light source device further comprises a circuit board that connects the light source device to the computing device.

6. A method of a computing device for calibrating light channels of a light source device that is electronically connected to the computing device, the method comprising:
   (a) selecting one or more channel options of an illumination selecting unit of the computing device to turn on the one or more the light channels of the light source device;
   (b) controlling a camera unit of the light source device to capture a first image of the light source device and polarizing the first image into a first polarized image;
   (c) marking a zone and a serial number of each light channel on the first polarized image according to a position of each light channel on the light source device, and storing the marked first polarized image in a storage system of the computing device;
   (d) eliminating each channel option of the illumination selecting unit to turn off each light channel one by one, wherein one of the light channels is turned off each time, wherein a remaining part of the light channels of the light source device remain on;
   (e) controlling the camera unit to capture a second image of the light source device when one of the light channels is turned off, and polarizing the second image to generate a second polarized image;
   (f) comparing the first polarized image and the second polarized image, determining a correlation between the light channel that is turned off and the channel option that is eliminated, and storing the correlation in the storage system;
   (g) modifying serial numbers of the channel options according to correlations between each light channel and each channel option stored in the storage system when each light channel has been turned off and the correlations are determined.

7. The method of claim 6, wherein the camera unit captures the first image or the second image of the light source device by taking a picture of a reflection image of the light source device from a glass that is placed in front of the light source device.

8. The method of claim 6, wherein the step (f) further comprises:
   comparing the first polarized image and the second polarized image;
   recognizing a serial number of a light channel that is turned off; and
   determining the correlation between the light channel that is turned off and the channel option that is eliminated.

9. The method of claim 6, wherein the serial number of the channel option is the same as a serial number of a light channel that correlates with the channel option after the serial numbers of the channel options are modified.

10. The method of claim 6, wherein the light source device further comprises a circuit board that connects the light source device to the computing device.

11. A non-transitory storage medium storing a set of instructions, the set of instructions capable of being executed by a processor of a computing device, causes the processor to execute a method for calibrating light channels of a light source device that is electronically connected to the computing device, the method comprising:
   (a) selecting one or more channel options of an illumination selecting unit of the computing device to turn on the one or more the light channels of the light source device;
   (b) controlling a camera unit of the light source device to capture a first image of the light source device and polarizing the first image into a first polarized image;
   (c) marking a zone and a serial number of each light channel on the first polarized image according to a position of each light channel on the light source device, and storing the marked first polarized image in a storage system of the computing device;
   (d) eliminating each channel option of the illumination selecting unit to turn off each light channel one by one, wherein one of the light channels is turned off each time, wherein a remaining part of the light channels of the light source device remain on;
   (e) controlling the camera unit to capture a second image of the light source device when one of the light channels is turned off, and polarizing the second image to generate a second polarized image;
   (f) comparing the first polarized image and the second polarized image, determining a correlation between the light channel that is turned off and the channel option that is eliminated, and storing the correlation in the storage system;
   (g) modifying serial numbers of the channel options according to correlations between each light channel and each channel option stored in the storage system when each light channel has been turned off and the correlations are determined.

12. The storage medium of claim 11, wherein the camera unit captures the first image or the second image of the light source device by taking a picture of a reflection image of the light source device from a glass that is placed in front of the light source device.

13. The storage medium of claim 11, wherein the step (f) further comprises:
   comparing the first polarized image and the second polarized image;
   recognizing a serial number of a light channel that is turned off; and
   determining the correlation between the light channel that is turned off and the channel option that is eliminated.

14. The storage medium of claim 11, wherein the serial number of the channel option is the same as a serial number of a light channel that correlates with the channel option after the serial numbers of the channel options are modified.

15. The storage medium of claim 11, wherein the light source device further comprises a circuit board that connects the light source device to the computing device.

* * * * *